United States Patent [19]

Wu et al.

[11] Patent Number: 6,037,399

[45] Date of Patent: *Mar. 14, 2000

[54] MICROEMULSION POLYMERIZATION SYSTEMS FOR THE PRODUCTION OF SMALL MELT-PROCESSIBLE FLUOROPOLYMER PARTICLES

[75] Inventors: Huey Shen Wu, Newark; Jack Hegenbarth, Wilmington, both of Del.; Chen Xin-Kang; Chen Jian-Guo, both of Shanghai, China

[73] Assignee: W. L. Gore & Associates, Inc., Newark, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/672,779

[22] Filed: Jun. 28, 1996

Related U.S. Application Data

[62] Division of application No. 08/374,007, Jan. 18, 1995, abandoned.

[51] Int. Cl.[7] ........................................ C08K 5/02
[52] U.S. Cl. .................... 524/462; 524/463; 524/742; 524/751; 524/752; 524/794; 524/795; 524/805
[58] Field of Search ................................... 524/805, 462, 524/463, 794, 795, 742, 751, 752

[56] References Cited

U.S. PATENT DOCUMENTS

| | | | |
|---|---|---|---|
| 2,549,935 | 4/1951 | Sauer | 260/87.5 |
| 2,562,547 | 7/1951 | Hanford et al. | 260/648 |
| 2,662,065 | 12/1953 | Berry | 260/29.6 |
| 2,952,669 | 9/1960 | Bro | 260/87.5 |
| 3,721,638 | 3/1973 | Sianesi et al. | |
| 4,025,481 | 5/1977 | Tournut et al. | |
| 4,384,092 | 5/1983 | Blaise et al. | |
| 4,677,000 | 6/1987 | Gardaz et al. | 427/261 |
| 4,855,162 | 8/1989 | Wrasidlo et al. | 427/243 |
| 4,864,006 | 9/1989 | Giannetti et al. | 526/209 |
| 5,032,655 | 7/1991 | Moore | 526/247 |
| 5,211,220 | 5/1993 | Swozil et al. | 156/133 |
| 5,276,261 | 1/1994 | Mayer et al. | 524/546 |
| 5,310,836 | 5/1994 | Treat | 526/204 |
| 5,399,640 | 3/1995 | Hazlebeck | |
| 5,403,900 | 4/1995 | Wu et al. | |

FOREIGN PATENT DOCUMENTS

| | | |
|---|---|---|
| 248446 | 12/1987 | European Pat. Off. |
| 0612770 | 2/1993 | European Pat. Off. |

*Primary Examiner*—Judy M. Reddick
*Attorney, Agent, or Firm*—Gary A. Samuels

[57] ABSTRACT

An aqueous microemulsion polymerization procedure is described in which very small colloidal melt-processible fluoropolymer particles are produced from at least one gaseous monomer and optionally TFE. The polymerization procedure involves forming a microemulsion of at least one liquid organic compound; adding at least one gaseous free-radical polymerizable monomer to the microemulsion; and initiating polymerization by adding a free-radical initiator to the mixture.

8 Claims, No Drawings

MICROEMULSION POLYMERIZATION SYSTEMS FOR THE PRODUCTION OF SMALL MELT-PROCESSIBLE FLUOROPOLYMER PARTICLES

This application is a division of application Ser. No. 08/374,007, filed Jan. 18, 1995, now abandoned.

FIELD OF THE INVENTION

This invention relates to melt-processible fluoropolymers; and to a process for polymerizing monomers to make the fluoropolymers.

BACKGROUND OF THE INVENTION

Microemulsions are stable isotropic mixtures of oil, water, and surfactant which form spontaneously upon contact of the ingredients. Other components, such as salt or co-surfactant (such as an alcohol, amine, or other amphiphilic molecule) may also be part of the microemulsion formulation. The oil and water reside in distinct domains separated by an interfacial layer rich in surfactant. Because the domains of oil or water are so small, microemulsions appear visually transparent or translucent. Unlike emulsions, microemulsions are equilibrium phases.

Microemulsions can have several microstructures, depending mainly upon composition and sometimes open temperature and pressure. There are three most common structures. One is an oil-in-water microemulsion in which oil is contained inside distinct domains in a continuous water-rich domain. The second is a water-in-oil microemulsion, in which water is contained inside distinct domains (droplets) in a continuous oil-rich domain. The third is a bicontinuous microemulsion in which there are sample-spanning intertwined paths of both oil and water, separated from each other by the surfactant-rich film.

Polymerization of emulsified and microemulsified unsaturated hydrocarbon monomers is known, where high reaction rates, high conversions and high molecular weights can be achieved. A microemulsion can be distinguished from a conventional emulsion by its optical clarity, low viscosity, small domain size, thermodynamic stability, and spontaneous formation. Polymerization of microemulsified monomers has many advantages over traditional emulsion polymerization. Microemulsions are normally transparent to translucent so that they are particularly suitable for photochemical reactions, while emulsions are turbid and opaque. Also, the structural diversity of microemulsions (droplets and bicontinuous) is set by thermodynamics, and rapid polymerization may be able to capture some of the original structure. In addition, microemulsion polymerization enables production of stable, monodisperse microlatexes containing colloidal particles smaller than those produced from classical emulsion polymerization processes. Smaller particle size improves the ability to form coatings without microcracking. The increased surface area improves particle fusion during molding operations.

Emulsion polymerization, as opposed to microemulsion polymerization, of dissolved gaseous tetrafluoroethylene (PTFE) or its copolymers is a known process. Aqueous colloidal dispersions of PTFE or its copolymers can be prepared in a pressure reactor by placing the gaseous monomer, or a mixture of monomers in contact with an aqueous solution containing at least one surfactant which generally is a fluorinated surfactant, possibly a buffer for keeping the medium at a given pH, and an initiator which is capable of forming free radicals at the polymerization temperature. The free radical initiators can be water soluble peroxides, or alkaline or ammonium persulfates. Persulfate can be used alone if the polymerization temperature is above approximately 50° C., or in association with a reducing agent such as ferrous salt, silver nitrate, or sodium bisulfate if the polymerization temperature is approximately between 5 to 55° C., as described in the U.S. Pat. No. 4,384,092.

The gaseous monomer molecules in the foregoing process enter the aqueous liquid and react to form polymer without first forming a distinct liquid phase. Thus the polymer particles are large particles suspended in the aqueous mixture; and the process is not a true liquid-in-liquid emulsion polymerization. The process is sometimes referred to as dispersion polymerization.

Additives have been used in attempts to alter the polymerization processes and products thereof. For example, in U.S. Pat. No. 3,721,638, a perfluorinated ether ketone is taught as being added to an aqueous phase polymerization system for polymerizing tetrafluoroethylene, but the initial product is in the form of an aqueous gel.

Attempts have been made to prepare tetrafluoroethylene copolymers in aqueous dispersion systems. For example, EP 0612770 teaches the copolymerization of TFE and fluoroalkyl perfluorovinyl ethers in an aqueous system containing methylene chloride to obtain dispersion copolymer particles of an average of less than 50 nm in size.

U.S. Pat. No. 4,864,006 describes the polymerization of TFE and hexafluoropropylene (HFP) to make a copolymer in an aqueous microemulsion containing a perfluoropolyether in which the resulting copolymer particles have a size ranging from 0.041 to 0.070 micrometer.

Microemulsion polymerization operates by a different mechanism than emulsion polymerization. It involves polymerization of liquid monomer rather than gaseous monomers. Because the polymerization involves polymerizates of unusually small cells of liquid monomer, the resulting polymer particles are unusually small. However, polymerization of liquid TFE is not usually practiced, because of the potential hazards of handling liquid TFE.

It is desirable to provide a process for polymerizing gaseous fluorinated monomers, such as TFE, to produce homopolymer and copolymer dispersions in which the particle size of the polymer particles is very small. Microemulsion polymerization systems would be useful in reaching this goal if a means could be found for adapting gaseous TFE to polymerization in an aqueous microemulsion system.

SUMMARY OF THE INVENTION

The aqueous microemulsion polymerization procedure of the invention involves:

1) forming an aqueous microemulsion of a liquid saturated perfluorinated aliphatic or aromatic hydrocarbon having up to two oxygen, nitrogen or sulfur atoms and having a molecular weight preferably below 500;

2) feeding at least one gaseous polymerizable fluorinated monomer other than tetrafluoroethylene and, optionally additionally, tetrafluoroethylene to the microemulsion; and 3) initiating polymerization by adding a free-radical initiator.

The microemulsion is formed by adding the perfluorinated saturated aliphatic or aromatic hydrocarbon in liquid form and a fluorinated organic surfactant to water in proportions and at temperatures that result in formation of a microemulsion.

Very small aqueous dispersion polymer particles are formed as a result of the polymerization, on the order of 80 nm or less (0.08 micrometer). The average particle size may be less than 60 nm or even less than 30 nm. The polymers produced are thermoplastic, i.e., melt-processible. The polymer is preferably a copolymer of TFE containing enough comonomer units to render thermoplastic the typically non-thermoplastic TFE.

DETAILED DESCRIPTION OF THE INVENTION

In this invention, an aqueous microemulsion polymerization procedure is described for producing unusually small particles of melt-processible fluoropolymers in which the polymerization is carried out in the presence of microemulsified seed particles or micelles of a liquid perfluorinated hydrocarbon that is a saturated aliphatic or aromatic organic compound having up to two oxygen, nitrogens, or sulfur atoms and a molecular weight preferably below 500.

The polymer particles so produced are usually small, being on the order of one average size of 1 to 80 nanometers (0.001 to 0.080 micrometer,) preferably 1 to 60 nanometers and most preferably 1 to 30 nanometers. It is believed that such unusually small polymer particles are obtained because polymerization of the gaseous TFE takes place inside the very small micelles of the hydrocarbon organic compound in the microemulsion.

The perfluorinated hydrocarbon is a low molecular weight compound that is liquid at the temperature at which polymerization is carried out. The molecular weight is preferably less than 500. The perfluorinated hydrocarbon preferably has a boiling point less than 230° C. The perfluorinated hydrocarbon can be a perfluorinated saturated aliphatic compound such as a perfluorinated alkane; a perfluorinated aromatic compound such as perfluorinated benzene, or perfluorinated tetradecahydro phenanthene. It can also be a perfluorinated alkyl amine such as a perfluorinated trialkyl amine. It can also be a perfluorinated cyclic aliphatic, such as decalin; and preferably a heterocyclic aliphatic compound containing oxygen or sulfur in the ring, such as perfluoro-2-butyl tetrahydrofuran.

Examples of perfluorinated hydrocarbons include perfluoro-2-butyltetrahydrofuran, perfluorodecalin, perfluoromethyldecalin, perfluorodimethyldecalin, perfluoromethylcyclohexane, perfluoro(1,3-dimethylcyclohexane), perfluorodimethyidecahydronaphthalene, perfluorofluoorene, perfluoro(tetradecahydrophenanthrene), perfluorotetracosane, perfluorokerosenes, octafluoronaphthalene, oligomers of poly(chlorotrifluoroethylene), perfluoro(trialkylamine) such as perfluoro(tripropylamine), perfluoro(tributylamine), or perfluoro(tripentylamine), and octafluorotoluene, hexafluorobenzene, and commercial fluorinated solvents, such as Fluorinert FC-75 produced by 3M. The fluorinated alkanes can be linear or branched, with a carbon atom number between 3 and 20. Oxygen, nitrogen or sulfur atoms can be present in the molecules, but the number of such atoms per molecule should be two or less.

The preparation of the microemulsion depends on careful selection of the ingredients. The microemulsion is prepared by mixing water, perfluorinated hydrocarbon, fluorinated surfactant(s), and optionally cosolvents or inorganic salts. The amounts employed are 0.1–40 weight percent, preferably 0.1–20, of the perfluorinated hydrocarbon; 1–40 weight percent, preferably 0.1–25, of the surfactant and optionally cosurfactants; with the remainder water. The microemulsified perfluorinated hydrocarbons are believed to serve as microreactors for fluorinated monomers to enter and to be polymerized. The average particle size of the microemulsions can be in the range of 1 to 80 nanometer, preferably 1 to 60, most preferably 1 to 30. The temperature of the microemulsion formation can be between 0 to 150° C., preferably 40 to 100° C.

The fluorinated surfactant has the structure $R_f E X$, where $R_f$ is a fluorinated alkyl group with a carbon number between 4 and 16, E is an alkylene group with a carbon number between 0 and 4, and X is an anionic salt such as COOM, $SO_3M$, $SO_3NR_2$, $SO_4M$, a cationic moiety such as quarternary ammonium salt, or an amphoteric moiety such as aminoxide, or a non-ionic moiety such as $(CH_2CH_2O)_nH$; and M is H, Li, Na, K, or $NH_4$; R is a 1 to 5C alkyl group and n is a cardinal number of 2 to 40.

The polymerizable fluorinated monomers that are other than tetrafluoroethylene, include hexafluoroethylene, perfluoro alkyl vinyl ether, trifluoroethylene, vinylidene fluoride, vinyl fluoride, chlorotrifluoroethylene. Nonfluorinated monomers can be used as comonomers, such as vinylidene chloride, vinyl chloride, ethylene, propylene, butadiene. The monomer is preferably free-radical polymerizable, and preferably is ethylenically unsaturated.

To initiate polymerization, the temperature of the microemulsion is adjusted to between 0 and 150° C., preferably 40 to 100° C. Initiators for polymerization include free-radical initiators, such as persulfates, azo initiators, peroxides, or photo initiators which can generate free radicals by ultraviolet or gamma rays. Amount of initiators present can range between 0.001 to 5 percent by weight based on the final polymer content. Cosolvents such as an alcohol, amines or other amphiphilic molecules, or salt can be employed if desired to facilitate formation of the microemulsion.

The fluorinated gaseous monomers are introduced to the reactor from the vapor phase into the aqueous microemulsion phase. Sufficient mixing between liquid and vapor phase is important to encourage mass transfer. The mechanism of forming the ultra small fluorinated melt-processible polymer particles in this invention is not fully understood. It is believed that the higher the solubility of the monomers in the perfluorinated hydrocarbon, the better to achieve the original microemulsion particle size and shape. The time of reaction may be between 1 and 500 minutes.

The resulting polymer particles in the resulting dispersion have an average particle size of between 1 and 80 nanometer, preferably 1 to 60, most preferably 1 to 30, and a polymer average molecular weight of over 100,000, preferably over 1,000,000. The unusually small particle size provides a polymer system with a number of advantages over systems containing larger particles. The system is an aqueous colloidal dispersion and is clear rather than turbid.

The small particle size aids in producing coatings of uniform thickness and aids in imparting good gas permeability of porous substrates. The fluorinated monomer units in the polymer chain aid in increasing the thermal stability, hydrophobicity and oleophobicity of substrates to which the polymer is applied. The polymer so produced can be applied to substrates directly from the colloidal dispersion by immersing the substrate material into the dispersion, or by painting the substrate with the dispersion, or by spraying the dispersion onto the substrate or the like. Suitable substrates include fabrics, woven or nonwoven materials, screens, papers, or porous or microporous membranes of any form including sheets or tubes. Once the coating is applied to the substrate, any water, surfactant or initiators remaining can be drawn off by any convenient means, such as heating, steam stripping, vacuum evaporation or the like.

The resulting product is a coated substrate with the coating present as a surface layer if the substrate is non-porous. For porous substrates, which include ones made from porous polymer membranes, and especially microporous polymeric membranes, the coating is ordinarily present as a coating on the internal structure of the substrate that makes up the pores. A particularly preferred porous substrate is a microporous polytetrafluoroethylene made by stretching polytetrafluoroethylene tape or film as described in Gore U.S. Pat. No. 3,953,566. In this procedure, the structure comprises an interconnected network of nodes and fibrils interconnecting the nodes, the nodes and fibrils comprising the internal structure that defines the pores. The resulting coated articles provide gas permeable articles of enhanced hydrophobicity and oleophobicity and filtration efficiency properties. This makes them useful as gas filters, vent filters, as insulation for electrical wiring, and in garment constructions where oil and water repellency is desired.

TEST PROCEDURES

Particle Size Determination

A COULTER N4MD particle size analyzer was used. The mean diameter is measured using light scattering method with helium laser at scattering angle of 90 degree. Each aqueous dispersion sample was diluted about 10,000 times with deionized water before measurement.

Air Permeability: Gurley Number Test

Gurley numbers were obtained as follows: The resistance of samples to air flow was measured by a Gurley densometer (ASTM D726-58) manufactured by W. & L. E. Gurley & Sons. The results are reported in terms of Gurley Number which is the time in seconds for 100 cubic centimeters of air to pass through 1 square inch of a test sample at a pressure drop of 4.88 inches of water.

Oil Repellency Test

Oil rating was carried out by AATCC Test Method 118–1983. The higher the number, the better the oil repellency. The highest number is 8.

Melting Temperature

The melting temperature of a polymer was determined by Differential Scan Calorimetric (DSC) analysis at a heating rate of 10° C./minute under nitrogen purge. If it shows a major endotherm at the peak of a certain temperature, it is reported as the melting temperature of the polymer.

EXAMPLE 1

In a 2-liter reactor were added 900 grams of deionized water, 50 grams of Fluorinert FC-75 (obtained from 3M Co., and containing as major ingredient, perfluoro-2-butyltetrahydrofuran), and 25 grams of ammonium perfluorooctanoate (Fluororad FC-143, 3M). The mixture formed a transparent microemulsion phase at room temperature and was stirred at a speed of about 1200 rpm. The reactor was then vacuumed and purged with tetrafluoroethylene gas three times to ensure oxygen content in the mixture to be below 30 ppm. Then the temperature of the mixture was raised to and maintained at about 80° C. Then 820 grams of hexafluoropropylene were charged to the reactor, and the pressure inside the reactor was raised to about 3150 kPa with a supply of tetrafluoroethylene gas. 1.0 gram of ammonium persulfate initiator in 50 grams of water was pumped into the reactor to start the reaction. The pressure inside the reactor dropped, and was then maintained at about 3,000 kPa by entering a constant supply of tetrafluoroethylene gas. The reaction proceeded for about 130 minutes and was stopped.

The colloidal mixture produced from the above reaction was a clear, transparent dispersion. The solid polymer content was about 6.4% by weight. The average polymer particle size was about 24 nanometer. Differential Scan Calorimetric analysis of the polymer shows a major endotherm at the peak of 207° C., which is within the typical melting temperature of a copolymer of tetrafluoroethylene and hexafluoroethylene.

EXAMPLE 2

In a 2-liter reactor were added 900 grams of deionized water, 25 grams of Fluorinert FC-75 (3M) (perfluoro-2-butyltetrahydrofuran), and 25 grams of ammonium perfluorooctanoate (Fluororad FC-143, 3M). The mixture formed a transparent microemulsion phase at room temperature and was stirred at a speed of about 1200 rpm. The reactor was then vacuumed and purged with tetrafluoroethylene gas three times to ensure oxygen content in the mixture to be below 30 ppm. Then the temperature of the mixture was raised to and maintained at about 80° C. 450 grams of hexafluoroproylene was charged to the reactor and the pressure inside the reactor was raised to about 3100 kPa with a supply of tetrafluoroethylene gas. 1.0 gram of ammonium persulfate in 50 grams of water was pumped into the reactor to start the reaction. The pressure inside the reactor was maintained at 3100 kPa by addition of a constant supply of tetrafluoroethylene. The reaction proceeded for about 60 minutes after ammonium persulfate was charged. Then an additional 1.5 grams of ammonium persulfate in 50 grams of water was charged to the reactor. The reaction continued to proceed for another 130 minutes and was stopped.

The colloidal dispersion produced from the above reaction was a clear, transparent dispersion. The solid polymer content was about 9% by weight. The average polymer particle size was about 12 nanometer. Differential Scanning Calorimetric analysis shows a major endotherm at 210° C., which is within the typical melting temperature range of a copolymer of tetrafluorcoethylene and hexafluoropropylene.

EXAMPLE 3

Coated Substrates

The dispersions produced from Example 1 and Example 2 were diluted with 10% by weight ammonium perfluorooctanoate aqueous solution. One part of dispersion was added with one part of 10% by weight ammonium perfluorooctanoate aqueous solution. Then the diluted solutions were used to coat expanded porous polytetrafluoroethylene (PTFE) membranes obtained from W. L. Gore & Associates. The PTFE membrane had a Gurley number of 10 seconds which means it was air permeable. The dispersions were applied to the membranes by spraying on one side of the membranes. The membranes were completely wetted by the dispersion. Excess fluid on the surface of the membranes was removed by dripping. The coated membranes were then placed in an oven at 250° C. for 3 minutes to remove water and surfactant and then were subject to testing.

Membranes coated with the above described diluted dispersion from Example 1 and Example 2 had oil repellency rating of 4 and 5 respectively Gurley numbers between 10 and 15 seconds. The uncoated membranes have oil repellency rating of only 1.

We claim:

1. An aqueous dispersion comprising:
   (a) water;
   (b) colloidal particles of a copolymer of units of tetrafluoroethylene and at least one other fluorinated monomer;
   (c) 0.1 to 40% by weight of dispersion of a liquid perfluorinated hydrocarbon having a molecular weight below 500, and being selected from the class consisting of
      (i) perfluorinated aromatic compounds; and
      (ii) perfluorinated heterocyclic aliphatic compounds that contain oxygen or sulfur in the ring;
      and wherein the particles have an average size between 1 and 80 nanometers.

2. The aqueous dispersion of claim 1 wherein the perfluorinated hydrocarbon is a perfluorinated heterocyclic aliphatic compound that contains oxygen or sulfur in the ring.

3. The aqueous dispersion of claim 2 wherein the heterocyclic aliphatic compound is perfluoro-2-butyl tetrahydrofuran.

4. The aqueous dispersion of claim 1 wherein other the fluorinated monomer is hexafluoropropylene.

5. The aqueous dispersion of claim 1 wherein the particles have an average particle size between 1 and 50 nanometers.

6. The aqueous dispersion of claim 2 wherein the particles have an average particle size between 1 and 50 nanometers.

7. The aqueous dispersion of claim 1 wherein the particles have an average particle size between 1 and 30 nanometers.

8. The aqueous dispersion of claim 2 wherein the particles have an average particle size between 1 and 30 nanometers.

* * * * *